US012617901B2

(12) United States Patent
Schäfer et al.

(10) Patent No.: US 12,617,901 B2
(45) Date of Patent: May 5, 2026

(54) COMPOSITIONS CONTAINING OXAMIDE-FUNCTIONAL SILOXANES

(71) Applicant: WACKER CHEMIE AG, Munich (DE)

(72) Inventors: Oliver Schäfer, Burghausen (DE); Oliver Fuhrmann, Altenmarkt (DE); Michael Joachimbauer, Gumpersdorf (DE)

(73) Assignee: WACKER CHEMIE AG, Munich (DE)

( * ) Notice: Subject to any disclaimer, the term of this patent is extended or adjusted under 35 U.S.C. 154(b) by 560 days.

(21) Appl. No.: 18/023,746

(22) PCT Filed: Sep. 3, 2020

(86) PCT No.: PCT/EP2020/074664
§ 371 (c)(1),
(2) Date: Feb. 28, 2023

(87) PCT Pub. No.: WO2022/048755
PCT Pub. Date: Mar. 10, 2022

(65) Prior Publication Data
US 2024/0034841 A1 Feb. 1, 2024

(51) Int. Cl.
C08G 77/388 (2006.01)
C08L 23/06 (2006.01)
C08L 23/12 (2006.01)

(52) U.S. Cl.
CPC ............ C08G 77/388 (2013.01); C08L 23/06 (2013.01); C08L 23/12 (2013.01); *C08L 2203/30* (2013.01); *C08L 2207/062* (2013.01)

(58) Field of Classification Search
CPC .............................. C08G 77/26; C08G 77/388

USPC ....................................................... 528/28, 38
See application file for complete search history.

(56) References Cited

U.S. PATENT DOCUMENTS

| | | | |
|---|---|---|---|
| 4,724,248 A | 2/1988 | Dexter et al. | |
| 5,264,604 A * | 11/1993 | Neri ....................... | C08G 77/26 556/419 |
| 5,302,735 A * | 4/1994 | Neri ........................ | C08L 55/02 556/419 |
| 5,587,151 A * | 12/1996 | Richard .............. | C08G 77/388 424/59 |
| 2007/0148474 A1 | 6/2007 | Leir et al. | |
| 2007/0249742 A1* | 10/2007 | Howie ..................... | G02B 1/04 521/85 |
| 2021/0171875 A1 | 6/2021 | Lehotkay et al. | |

FOREIGN PATENT DOCUMENTS

| | | |
|---|---|---|
| EP | 0252878 A1 | 1/1988 |
| EP | 0555893 A1 | 8/1993 |
| EP | 0568147 A1 | 11/1993 |
| EP | 0555893 B1 | 4/1997 |
| EP | 0940404 A1 | 9/1999 |
| EP | 1963404 B1 | 3/2023 |
| JP | S6323930 A | 2/1988 |
| JP | H0625418 A | 2/1994 |
| JP | 2000191467 A | 7/2000 |
| KR | 960004306 B1 | 3/1996 |
| KR | 20200098629 A | 8/2020 |
| WO | 2010077477 A1 | 7/2010 |

* cited by examiner

*Primary Examiner* — Margaret G Moore
(74) *Attorney, Agent, or Firm* — BROOKS KUSHMAN P.C.

(57) ABSTRACT

A composition includes thermoplastic polymers and at least one organosilicon compound of the general formula $R_{3-a-b}(OR^1)_a R^2_b Si[OSiR_2]_p[OSiRR^2]_q[OSiR^2_2]_r OSiR_{3-a-b}(OR^1)_a R^2_b$ (I), wherein a+b is $\leq 3$ and at least one $R^2$ radical is present.

11 Claims, No Drawings

COMPOSITIONS CONTAINING OXAMIDE-FUNCTIONAL SILOXANES

CROSS-REFERENCE TO RELATED APPLICATION

This application is a U.S. National Phase Application of PCT/EP2020/074664, filed Sep. 3, 2020, the entire disclosure of which is hereby incorporated by reference.

BACKGROUND

The invention relates to oxamide-functional siloxanes, processes for the preparation thereof and to the use of oxamide-functional siloxanes in thermoplastic compositions.

Thermoplastic polymers such as polyethylene or polypropylene make up the majority of plastics produced worldwide today. In recent years, advances in manufacturing technology for these polymers have made possible increasingly high-performance materials. Despite the inherently good processing properties, processing these still requires the use of process additives to optimize properties such as processing speed, surface quality, mold-release behavior, rheology control, and others. Besides oligomeric additives such as fatty acid amides, fatty acid esters, metal stearates, oligomeric hydrocarbon waxes (PE waxes), use is also made of higher-molecular-weight polymers such as fluoropolymers. A challenge here is to minimize as far as possible the use of these process additives so as to minimize any adverse effect on other material properties of polyolefins, such as stiffness or scratch resistance, while at the same time maximizing the desired effect in the particular case, such as increasing processing speed. There has accordingly been a search for novel additive concepts that show increased effectiveness compared to products used in the prior art.

WO 2010/077477 A1 describes linear polysiloxane-poly(ox)amide copolymers that can be used as process additives in thermoplastics. The main disadvantage of using these products in these applications is the usually high molecular weight of the copolymers used, which leads to poor distribution in the matrix thermoplastics and thus to process improvements that are often insufficient.

EP-B1 555 893 describes polymeric stabilizers based on oxamidosilanes and hydrolysates thereof in combination with copper powder, which can be used in polyolefins. An influence on the processing properties of the polyolefins was not disclosed here.

It has surprisingly been found that by combining linear silicones having relatively low molecular weights and small proportions of specific aliphatic oxamido substituents, compounds were obtained which exhibit significant process improvements when mixed into thermoplastics.

BRIEF SUMMARY

Embodiments of a composition are described below. In an embodiment, the composition comprises (A) thermoplastic polymers and (B) at least one organosilicon compound of the general formula $R_{3-a-b}(OR^1)_a R^2{}_b Si[OSiR_2]_p[OSiRR^2]_q[OSiR^2{}_2]_r OSiR_{3-a-b}(OR^1)_a R^2{}_b$(I), where R may be identical or different and is a monovalent, optionally substituted, SiC-bonded hydrocarbon radical, $R^1$ may be identical or different and is a hydrogen atom or a monovalent, optionally substituted hydrocarbon radical, $R^2$ is a SiC-bonded unit of the general formula $$R^3—X—[CO—(CO)_n]—X—R^4— \tag{II}$$

where

X may be identical or different and is —O— or —NR$^x$—, $R^3$ may be identical or different and are monovalent, optionally substituted hydrocarbon radicals having at least 6 carbon atoms, $R^4$ are divalent, optionally substituted hydrocarbon radicals having 1 to 40 carbon atoms, wherein individual carbon atoms may be replaced by oxygen atoms or —NR$^z$—, $R^x$ may be identical or different and is a hydrogen atom or monovalent, optionally substituted hydrocarbon radicals having 1 to 20 carbon atoms, wherein individual carbon atoms may be replaced by oxygen atoms, $R^z$ may be identical or different and is a hydrogen atom or monovalent, optionally substituted hydrocarbon radicals having 1 to 20 carbon atoms, wherein individual carbon atoms may be replaced by oxygen atoms, n is 0 or 1, a is 0, 1, 2 or 3, b is 0 or 1, p is an integer from 1 to 1000, q is 0 or an integer from 1 to 100 and r is 0 or an integer from 1 to 100.

In this embodiment, a+b is ≤3 and at least one $R^2$ radical is present.

DETAILED DESCRIPTION

Examples of polymers (A) used according to the invention are polyethylene, polypropylene, polyamide, polyethylene terephthalate, polybutylene terephthalate, thermoplastic elastomers based on crosslinked rubber, ethylene-vinyl acetate, polyhydroxybutyrate and/or copolymers or mixtures thereof, and also polystyrene, impact-modified polystyrene, styrene-acrylonitrile copolymers, acrylonitrile-butadiene-styrene copolymers, polyvinyl chloride, polyvinylidene fluoride, ethylene tetrafluoroethylene (ETFE), polymethyl methacrylate, polycarbonate, polyaryletherketone, polyacrylonitrile, polyetherimide, polyethylene naphthalate, polyethersulfone, polyimide, polyketone, polyoxymethylene, polyphenylene sulfide, polyphenylene sulfone, polysulfone and copolymers or mixtures thereof.

Preferred examples of component (A) used according to the invention are low and high density polyethylenes (LDPE, LLDPE, HDPE), homo- and copolymers of propylene with, for example, ethylene, butene, hexene and octene (PP), olefin copolymers such as ethylene-vinyl acetate copolymers (EVA), olefin copolymers such as ethylene-methyl acrylate copolymer (EMA) or ethylene-butyl acrylate copolymer (EBA), polyvinyl chloride (PVC) or polyvinyl chloride-ethylene copolymers and polystyrenes (PS, HIPS, EPS), wherein particular preference is given to polyethylene, polypropylene, polyamide, polyethylene terephthalate or polybutylene terephthalate.

Polyolefins (A) used according to the invention especially preferably comprise units of the general formula $$[—CR^6R^7—CR^8R^9—]_x \tag{III}$$

where $R^6$, $R^7$, $R^8$, and $R^9$ are each independently a hydrogen atom, saturated, optionally substituted hydrocarbon radicals, unsaturated hydrocarbon radicals, aromatic hydrocarbon radicals, vinyl ester radicals or a halogen atom and x is a number between 100 and 100 000.

Preferably, radicals $R^6$, $R^7$, $R^8$, and $R^9$ are each independently a hydrogen atom, saturated hydrocarbon radicals such as a methyl, butyl or hexyl radical, aromatic hydrocarbon radicals such as a phenyl radical, or halogen atoms such as chlorine or fluorine, particular preference being given to a hydrogen atom, methyl radical or chlorine atom.

Preferred monomers for the production of component (A) are ethylene, propylene, vinyl chloride, vinyl acetate, styrene, 1-butene, 1-hexene, 1-octene or butadiene or mixtures thereof, more preferably ethylene, propylene or vinyl chloride.

The polymers (A) used according to the invention are, in particular, homo- or copolymers of ethylene or propylene.

The polymers (A) are especially preferably high-density polyethylene (HDPE) or polypropylene.

In the case of the thermoplastic polymers (A) used according to the invention, the temperature at which the loss factor (G"/G') according to DIN EN ISO 6721-2:2008 has the value of 1, is preferably at least 40° C., particularly preferably at least 100° C.

The polymeric structure of the thermoplastic polymers (A) can be linear but also branched.

The nature of the organic polymers (A) used essentially determines the processing temperature of the mixture of the invention.

The proportion of the thermoplastic polymers (A) in the composition according to the invention is preferably 50% by weight to 99.99% by weight, particularly preferably 90% by weight to 99.90% by weight, especially preferably 97.5% by weight to 99.90% by weight.

The component (A) used in accordance with the invention is a commercially available product or it can be produced by standard chemical processes.

Examples of R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl and 2-propenyl radical; aryl radicals such as the phenyl, naphthyl, anthryl and phenanthryl radical; alkaryl radicals such as o-, m-, p-tolyl radicals, xylyl radicals and ethylphenyl radicals; or aralkyl radicals such as the benzyl radical or the α- and β-phenylethyl radicals.

Examples of halogenated radicals R are haloalkyl radicals such as the 3,3,3-trifluoro-n-propyl radical, the 2,2,2,2',2',2'-hexafluoroisopropyl radical and the heptafluoroisopropyl radical.

The radical R is preferably a monovalent hydrocarbon radical having 1 to 20 carbon atoms, optionally substituted by fluorine and/or chlorine atoms, more preferably a hydrocarbon radical having 1 to 6 carbon atoms, especially the methyl, ethyl, vinyl or phenyl radical.

Examples of radical $R^1$ are the radicals specified for the radical R and also polyalkylene glycol radicals attached via a carbon atom.

The radical $R^1$ is preferably hydrocarbon radicals, more preferably hydrocarbon radicals having 1 to 8 carbon atoms, especially the methyl or ethyl radical.

Examples of radical $R^3$ are the examples specified for the radical R for optionally substituted hydrocarbon radicals having at least 6 carbon atoms, such as n-hexyl radicals or dodecyl radicals.

The radical $R^3$ is preferably aliphatic hydrocarbon radicals having at least 6 carbon atoms, particularly preferably aliphatic hydrocarbon radicals having at least 10 carbon atoms.

Examples of radical $R^4$ are alkylene radicals such as the methylene, ethylene, n-propylene, isopropylene, n-butylene, isobutylene, tert-butylene, n-pentylene, isopentylene, neopentylene, tert-pentylene, hexylene, heptylene, octylene, nonylene, decylene, dodecylene or octadecylene radicals; cycloalkylene radicals such as the cyclopentylene radical, 1,4-cyclohexylene radical, isophoronylene radical or 4,4'-methylenedicyclohexylene radical; alkenylene radicals such as the vinylene, n-hexenylene, cyclohexenylene, 1-propenylene, allylene, butenylene or 4-pentenylene radical; alkynylene radicals such as the ethynylene or propargylene radical; arylene radicals such as the phenylene, bisphenylene, naphthylene, anthrylene or phenanthrylene radical; alkarylene radicals such as the o-, m-, p-tolylene radicals, xylylene radicals or ethylphenylene radicals; or aralkylene radicals such as the benzylene radical, the 4,4'-methylenediphenylene radical, the α- or β-phenylethylene radical or the ethylene-propylene ether radical or the ethylene-propylene amine radical.

The radical $R^4$ are alkylene radicals, particularly preferably methylene or n-propylene radicals.

Examples of radical $R^x$ and $R^z$ are each independently the radicals specified for the radical R and the hydrogen atom.

The radical $R^x$ is preferably a hydrogen atom or alkyl radicals, more preferably a hydrogen atom.

The radical $R^z$ is preferably a hydrogen atom or alkyl radicals, more preferably a hydrogen atom.

X preferably has the definition $-NR^X-$, where $R^x$ is as defined above.

Index n is preferably equal to 1.

Examples of radical $R^2$ are $H_{13}C_6-NH-CO-CO-NH-C_3H_6-$, $H_{15}C_7-NH-CO-CO-NH-C_3H_6-$, $H_{17}C_8-NH-CO-CO-NH-C_3H_6-$, $H_{19}C_9-NH-CO-CO-NH-C_3H_6-$, $H_{21}C_{10}-NH-CO-CO-NH-C_3H_6-$, $H_{23}C_{11}-NH-CO-CO-NH-C_3H_6-$, $H_{25}C_{12}-NH-CO-CO-NH-C_3H_6-$, $H_{27}C_{13}-NH-CO-CO-NH-C_3H_6-$, $H_{29}C_{14}-NH-CO-CO-NH-C_3H_6-$, $H_{31}C_{15}-NH-CO-CO-NH-C_3H_6-$, $H_{33}C_{16}-NH-CO-CO-NH-C_3H_6-$, $H_{35}C_{17}-NH-CO-CO-NH-C_3H_6-$, $H_{37}C_{18}-NH-CO-CO-NH-C_3H_6-$, $H_{39}C_{19}-NH-CO-CO-NH-C_3H_6-$, $H_{41}C_{20}-NH-CO-CO-NH-C_3H_6-$, $H_{13}C_6-NH-CO-NH-C_3H_6-$, $H_{15}C_7-NH-CO-NH-C_3H_6-$, $H_{17}C_8-NH-CO-NH-C_3H_6-$, $H_{19}C_9-NH-CO-NH-C_3H_6-$, $H_{21}C_{10}-NH-CO-NH-C_3H_6-$, $H_{23}C_{11}-NH-CO-NH-C_3H_6-$, $H_{25}C_{12}-NH-CO-NH-C_3H_6-$, $H_{27}C_{13}-NH-CO-NH-C_3H_6-$, $H_{29}C_{14}-NH-CO-NH-C_3H_6-$, $H_{31}C_{15}-NH-CO-NH-C_3H_6-$, $H_{33}C_{16}-NH-CO-NH-C_3H_6-$, $H_{35}C_{17}-NH-CO-NH-C_3H_6-$, $H_{37}C_{18}-NH-CO-NH-C_3H_6-$, $H_{39}C_{19}-NH-CO-NH-C_3H_6-$, $H_{41}C_{20}-NH-CO-NH-C_3H_6-$, $H_{11}C_6-NH-CO-CO-NH-C_3H_6-$, $H_{13}C_7-NH-CO-CO-NH-C_3H_6-$, $H_{15}C_8-NH-CO-CO-NH-C_3H_6-$, $H_{17}C_9-NH-CO-CO-NH-C_3H_6-$, $H_{19}C_{10}-NH-CO-CO-NH-C_3H_6-$, $H_{21}C_{11}-NH-CO-CO-NH-C_3H_6\neq$, $H_{23}C_{12}-NH-CO-CO-NH-C_3H_6-$, $H_{25}C_{13}-NH-CO-CO-NH-C_3H_6-$, $H_{27}C_{14}-NH-CO-CO-NH-C_3H_6-$, $H_{29}C_{15}-NH-CO-CO-$

5

$NH-C_3H_6-$, $H_{31}C_{16}-NH-CO-CO-NH-C_3H_6-$, $H_{33}C_{17}-NH-CO-CO-NH-C_3H_6-$, $H_{35}C_{18}-NH-CO-CO-NH-C_3H_6-$, $H_{37}C_{19}-NH-CO-CO-NH-C_3H_6-$, $H_{39}C_{20}-NH-CO-CO-NH-C_3H_6-$, $H_{13}C_6-NH-CO-CO-NH-C_2H_4-NH-C_3H_6-$, $H_{15}C_7-NH-C_2H_4-NH-CO-CO-NH-C_3H_6-$, $H_{17}C_8-NH-CO-CO-NH-C_2H_4-NH-C_3H_6-$, $H_{19}C_9-NH-CO-CO-NH-C_2H_4-NH-C_3H_6-$, $H_{21}C_{10}-NH-CO-CO-NH-C_2H_4-NH-C_3H_6-$, $H_{23}C_{11}-NH-CO-CO-NH-C_2H_4-NH-C_3H_6-$, $H_{25}C_{12}-NH-CO-CO-NH-C_2H_4-NH-C_3H_6-$, $H_{27}C_{13}-NH-CO-CO-NH-C_2H_4-NH-C_3H_6-$, $H_{29}C_{14}-NH-CO-CO-NH-C_2H_4-NH-C_3H_6-$, $H_{31}C_{15}-NH-CO-CO-NH-C_2H_4-NH-C_3H_6-$, $H_{33}C_{16}-NH-CO-CO-NH-C_2H_4-NH-C_3H_6-$, $H_{35}C_{17}-NH-CO-CO-NH-C_2H_4-NH-C_3H_6-$, $H_{37}C_{18}-NH-CO-CO-NH-C_2H_4-NH-C_3H_6-$, $H_{39}C_{19}-NH-CO-CO-NH-C_2H_4-NH-C_3H_6-$ and $H_{41}C_{20}-NH-CO-CO-NH-C_2H_4-NH-C_3H_6-$, wherein preference is given to $H_{21}C_{10}-NH-CO-CO-NH-C_3H_6-$, $H_{23}C_{11}-NH-CO-CO-NH-C_3H_6-$, $H_{25}C_{12}-NH-CO-CO-NH-C_3H_6-$, $H_{27}C_{13}-NH-CO-CO-NH-C_3H_6-$, $H_{29}C_{14}-NH-CO-CO-NH-C_3H_6-$, $H_{31}C_{15}-NH-CO-CO-NH-C_3H_6-$, $H_{33}C_{16}-NH-CO-CO-NH-C_3H_6-$, $H_{35}C_{17}-NH-CO-CO-NH-C_3H_6-$, $H_{37}C_{18}-NH-CO-CO-NH-C_3H_6-$, $H_{21}C_{10}-NH-CO-CO-NH-C_2H_4-NH-C_3H_6-$, $H_{23}C_{11}-NH-CO-CO-NH-C_2H_4-NH-C_3H_6-$, $H_{25}C_{12}-NH-CO-CO-NH-C_2H_4-NH-C_3H_6-$, $H_{27}C_{13}-NH-CO-CO-NH-C_2H_4-NH-C_3H_6-$, $H_{29}C_{14}-NH-CO-CO-NH-C_2H_4-NH-C_3H_6-$, $H_{31}C_{15}-NH-CO-CO-NH-C_2H_4-NH-C_3H_6-$, $H_{33}C_{16}-NH-CO-CO-NH-C_2H_4-C_2H_4-NH-C_3H_6-$, $H_{35}C_{17}-NH-CO-CO-NH-C_2H_4-NH-C_3H_6-$, $H_{37}C_{18}-NH-CO-CO-NH-C_2H_4-NH-C_3H_6-$ or mixtures thereof and particular preference is given to $H_{25}C_{12}-NH-CO-CO-NH-C_3H_6-$, $H_{29}C_{14}-NH-CO-CO-NH-C_3H_6-$, $H_{33}C_{16}-NH-CO-CO-NH-C_3H_6-$, $H_{25}C_{12}-NH-CO-CO-NH-C_2H_4-NH-C_3H_6-$, $H_{29}C_{14}-NH-CO-CO-NH-C_2H_4-NH-C_3H_6-$ or $H_{33}C_{16}-NH-CO-CO-NH-C_2H_4-NH-C_3H_6-$.

a is preferably 0 or 1, more preferably 0.

b is preferably 0 or 1, more preferably 1.

p is preferably an integer from 10 to 500, more preferably an integer from 30 to 300.

q is preferably 0 or an integer from 1 to 20, more preferably 0 or an integer from 1 to 5.

r is preferably 0 or an integer from 1 to 10, more preferably 0 or an integer from 1 to 5, especially 0.

The organosilicon compounds of the formula (I) used in accordance with the invention preferably have a number-average molecular weight Mn of 1000 g/mol to 35 000 g/mol and more preferably a number-average molecular weight Mn of 3000 g/mol to 20 000 g/mol.

The number-average molar mass $M_n$ is determined in the context of the present invention by size-exclusion chromatography (SEC) on a Styragel HR3-HR4-HR5-HR5 column set from Waters Corp. USA in THF with an injected volume of 100 µl against a polystyrene standard and at 60° C., a flow rate of 1.2 ml/min, and detection by RI (refractive index detector).

The organosilicon compounds of the formula (I) preferably have a melting point of below 200° C., particularly preferably of below 100° C., especially preferably of below 75° C., in each case at 1000 hPa.

The silicon content of the organosilicon compounds of the general formula (I) is preferably 25% to 37.5% by weight, more preferably 30% to 37% by weight.

The organosilicon compounds of formula (I) used in accordance with the invention are preferably $R_2R^2Si[OSiR_2]_p[OSiRR^2]_qOSiR_2R^2$ where R=methyl, $R^2=H_{25}C_{12}-NH_4[CO-CO]-NH-(CH_2)_3-$, p=150, q=0, R=methyl, $R^2=H_{25}C_{12}-NH_4[CO-CO]-NH-(CH_2)_3-$, p=80, q=0, R=methyl, $R^2=H_{25}C_{12}-NH_4[CO-CO]-NH-(CH_2)_3-$, p=250, q=0, R=methyl, $R^2=H_{33}C_{16}-NH_4[CO-CP]-NH-(CH_2)_3-$, p=150, q=0, R=methyl, $R^2=H_{33}C_{16}-NH_4[CO-CO]-NH-(CH_2)_3-$, p=80, q=0, R=methyl, $R^2=H_{33}C_{16}-NH_4[CO-CO]-NH-(CH_2)_3-$, p=250, q=0, R=methyl, $R^2=H_{25}C_{12}-NH-CO-NH-(CH_2)_3-$, p=150, q=0, R=methyl, $R^2=H_{25}C_{12}-NH-CO-NH-(CH_2)_3-$, p=80, q=0, R=methyl, $R^2=H_{25}C_{12}-NH-CO-NH-(CH_2)_3-$, p=250, q=0, R=methyl, $R^2=H_{33}C_{16}-NH-CO-NH-(CH_2)_3-$, p=150, q=0, R=methyl, $R^2=H_{33}C_{16}-NH-CO-NH-(CH_2)_3-$, p=80, q=0, R=methyl, $R^2=H_{33}C_{16}-NH-CO-NH-(CH_2)_3-$, p=250, q=0, R=methyl, $R^2=H_{25}C_{12}-NH-[CO-CO]-NH-(CH_2)_3-$, p=150, q=2, R=methyl, $R^2=H_{25}C_{12}-NH-[CO-CO]-NH-(CH_2)_3-$, p=80, q=1, R=methyl, $R^2=H_{25}C_{12}-NH-[CO-CO]-NH-(CH_2)_3-$, p=250, q=3, R=methyl, $R^2=H_{25}C_{12}-NH-[CO-CO]-NH-(CH_2)_2-NH-(CH_2)_3-$, p=150, q=0, R=methyl, $R^2=H_{25}C_{12}-NH-[CO-CO]-NH-(CH_2)_2-NH-(CH_2)_3-$, p=80, q=0, R=methyl, $R^2=H_{25}C_{12}-NH-[CO-CO]-NH-(CH_2)_2-NH-(CH_2)_3-$, p=250, q=0, R=methyl, $R^2=H_{25}C_{12}-NH-[CO-CO]-NH-(CH_2)_2-NH-(CH_2)_3-$, p=250, q=3, or organosilicon compounds of the formula (I) $R_3Si[OSiR_2]_p[OSiRR^2]_qOSiR_3$ where R=methyl, $R^2=H_{25}C_{12}-NH-[CO-CO]-NH-(CH_2)_3-$, p=150, q=2, R=methyl, $R^2=H_{25}C_{12}-NH-[CO-CO]-NH-(CH_2)_3-$, p=80, q=1, R=methyl, $R^2=H_{25}C_{12}-NH-[CO-CO]-NH-(CH_2)_3-$, p=250, q=4, R=methyl, $R^2=H_{25}C_{12}-NH-CO-NH-(CH_2)_3-$, p=150, q=2, R=methyl, $R^2=H_{25}C_{12}-NH-CO-NH-(CH_2)_3-$, p=80, q=1, R=methyl, $R^2=H_{25}C_{12}-NH-CO-NH-(CH_2)_3-$, p=250, q=4, R=methyl, $R^2=H_{25}C_{12}-NH-[CO-CO]-NH-(CH_2)_2-NH-(CH_2)_3-$, p=150, q=2, R=methyl, $R^2$=$H_{25}C_{12}$—NH—[CO—CO]—NH—$(CH_2)_2$—NH—$(CH_2)_3$—, p=80, q=1, R=methyl, $R^2$=$H_{25}C_{12}$—NH—[CO—CO]—NH—$(CH_2)_2$—NH—$(CH_2)_3$—, p=250, q=4, R=methyl, $R^2$=$H_{33}C_{16}$—NH—[CO—CO]—NH—$(CH_2)_3$—, p=150, q=2, R=methyl, $R^2$=$H_{33}C_{16}$—NH—[CO—CO]—NH—$(CH_2)_3$—, p=80, q=1, R=methyl, $R^2$=$H_{33}C_{16}$—NH—[CO—CO]—NH—$(CH_2)_3$—, p=250, q=3, R=methyl, $R^2$=$H_{33}C_{16}$—NH—[CO—CO]—NH—$(CH_2)_2$—NH—$(CH_2)_3$—, p=150, q=2, R=methyl, $R^2$=$H_{33}C_{16}$—NH—[CO—CO]—NH—$(CH_2)_2$—NH—$(CH_2)_3$—, p=80, q=1, R=methyl, $R^2$=$H_{33}C_{16}$—NH—[CO—CO]—NH—$(CH_2)_2$—NH—$(CH_2)_3$—, p=250, q=4, particularly preferably are $R_2R^2Si[OSiR_2]_p$ $[OSiRR^2]_qOSiR_2R^2$ where R=methyl, $R^2$=$H_{25}C_{12}$—NH—[CO—CO]—NH—$(CH_2)_3$—, p=150, q=0, R=methyl, $R^2$=$H_{33}C_{16}$—NH—[CO—CO]—NH—$(CH_2)_3$—, p=150, q=0, R=methyl, $R^2$=$H_{25}C_{12}$—NH—[CO—CO]—NH—$(CH_2)_3$—, p=150, q=2, R=methyl, $R^2$=$H_{25}C_{12}$—NH—[CO—CO]—NH—$(CH_2)_2$—NH—$(CH_2)_3$—, p=150, q=0, or organosilicon compounds of the formula (I) $R_3Si[OSiR_2]_p[OSiRR^2]_qOSiR_3$ where R=methyl, $R^2$=$H_{25}C_{12}$—NH—[CO—CO]—NH—$(CH_2)_3$—, p=150, q=2, R=methyl, $R^2$=$H_{25}C_{12}$—NH—[CO—CO]—NH—$(CH_2)_3$—, p=250, q=3, R=methyl, $R^2$=$H_{33}C_{16}$—NH—[CO—CO]—NH—$(CH_2)_3$—, p=150, q=2, R=methyl, $R^2$=$H_{33}C_{16}$—NH—[CO—CO]—NH—$(CH_2)_3$—, p=250, q=4, R=methyl, $R^2$=$H_{33}C_{16}$—NH—[CO—CO]—NH—$(CH_2)_2$—NH—$(CH_2)_3$—, p=150, q=2.

The present invention further relates to organosilicon compounds of the general formula $$R_{3-a-b}(OR^1)_aR^2{}_bSi[OSiR_2]_p[OSiRR^2]_q[OSiR^2{}_2]_rO\text{-}SiR_{3-a-b}(OR^1)_aR^2{}_b \qquad (I)$$

where

R may be identical or different and is a monovalent, optionally substituted, SiC-bonded hydrocarbon radical, $R^1$ may be identical or different and is a hydrogen atom or a monovalent, optionally substituted hydrocarbon radical, $R^2$ is a SiC-bonded unit of the general formula $$R^3\text{—}X\text{—[CO—CO]—}X\text{—}R^4\text{—} \qquad (II)$$

where

X may be identical or different and is —$NR^x$—, $R^3$ may be identical or different and are monovalent, optionally substituted hydrocarbon radicals having at least 6 carbon atoms, $R^4$ are divalent, optionally substituted hydrocarbon radicals having 1 to 40 carbon atoms, wherein individual carbon atoms may be replaced by oxygen atoms or —$NR^z$—, $R^x$ may be identical or different and is a hydrogen atom or monovalent, optionally substituted hydrocarbon radicals having 1 to 20 carbon atoms, wherein individual carbon atoms may be replaced by oxygen atoms, $R^z$ may be identical or different and is a hydrogen atom or monovalent, optionally substituted hydrocarbon radicals having 1 to 20 carbon atoms, wherein individual carbon atoms may be replaced by oxygen atoms, a is 0, 1 or 2, b is 0 or 1, p is an integer from 1 to 1000, q is 0 or an integer from 1 to 100 and r is 0 or an integer from 1 to 100, with the proviso that a+b is ≤3 and at least one $R^2$ radical is present.

In the case of the organosilicon compounds (B) used according to the invention or organosilicon compounds of formula (I) according to the invention, p is preferably greater than or equal to b+r+q, where b+r+q is ≥1.

It is particularly preferred in the case of the organosilicon compounds (B) used according to the invention or organosilicon compounds of the formula (I) according to the invention if p is >5×(b+q+r), in particular p>20×(b+q+r), where b+r+q is ≥1.

The present invention further relates to a process for the production of oxamide-functional siloxanes by reacting organosilicon compounds of the general formula $$R_{3-a-b}(OR^1)_aR^{11}{}_bSi[OSiR_2]_p[OSiRR^{11}]_q$$
$$[OSiR^{11}{}_2]_rOSiR_{3-a-b}(OR^1)_aR^{11}{}_b \qquad (I'),$$

where R, $R^1$, a, b, p, q and r have the definitions specified above and $R^{11}$ is a SiC-bonded unit of the general formula $$R^{10}\text{—O—[CO—CO]—}NR^x\text{—}R^4\text{—} \qquad (II')$$

where $R^4$, $R^x$ and n each have the definitions specified above and $R^{10}$ is a hydrogen atom or a monovalent, optionally substituted hydrocarbon radical, which may be interrupted by heteroatoms, with the proviso that a+b is ≤3 and at least one $R^{11}$ radical is present, with organic compounds of the general formula $$R^3\text{—}NR^x\text{—H} \qquad (IV),$$

where $R^3$ and $R^x$ have a definition specified for them above.

Examples of radical $R^{10}$ are the examples specified for radical R, preference being given to methyl, ethyl or propyl radicals and particular preference to methyl or ethyl radicals.

The organosilicon compounds of the formula (I') used in accordance with the invention are commercially available products or these can be produced by standard chemical processes.

The compounds of the formula (IV) are preferably primary amines, particularly preferably primary aliphatic amines, in particular primary aliphatic amines having a molecular weight of >115 g/mol and especially preferably dodecylamine, tetradecylamine, hexadecylamine or octadecylamine.

The compounds of the formula (IV) used in accordance with the invention are commercially available products or these can be produced by standard chemical processes.

In the process according to the invention, compounds of the formula (IV) are used in amounts of preferably 1 to 15% by weight, particularly preferably 2 to 10% by weight, in particular 3 to 8% by weight, based in each case on the weight of the organosilicon compounds of the formula (I').

In the process according to the invention, the organosilicon compounds of the formula (I') and the compounds of the formula (IV), and also optionally further components, can be mixed in any previously known manner. In this case, organosilicon compounds of the formula (I') are preferably initially charged in a reactor and the organic compounds of the formula (IV) are metered in. The metered addition according to the invention can be carried out either discontinuously or continuously. After or during the reaction between the organosilicon compounds of the formula (I') and the organic compounds of the formula (IV), the cleavage products formed can either be left in the product or removed by distillation. The removal by distillation can be carried out either at standard pressure or, preferably, at reduced pressure. The preferred temperatures during the reaction or removal of the condensation products are preferably between 0° C. and 150° C., particularly preferably between 20° C. and 100° C. The preferred pressure range is preferably between 10 hPa and 1500 hPa and particularly preferably between 20 hPa and 1013 hPa.

The reaction according to the invention is preferably carried out using protective gas, preferably nitrogen or argon.

The ratios between organosilicon compounds of the formula (I') and organic compounds of formula (IV) are preferably selected such that the organic compounds of formula (IV) are used at a molar ratio of 0.5 equivalents to 1.5 equivalents, particularly preferably from 0.9 equivalents to 1.1 equivalents, especially from 0.98 to 1.02 equivalents, based in each case on the reactive group of the formula (II').

The reaction between the amine group of the organic compounds of the formula (IV) and the reactive group (II') in the organosilicon compounds of the formula (I') used according to the invention is generally almost quantitative.

The reaction mixture according to the invention is removed from the reactor, preferably after at least partial removal of the cleavage products, preferably at temperatures above the melting point of the organosilicon compounds of the formula (I).

Component (B) is used in amounts of preferably 0.05 to 10 parts by weight, particularly preferably 0.1 to 5 parts by weight, especially 0.25 to 3 parts by weight, based in each case on 100 parts by weight of component (A).

In addition to components (A) and (B), the compositions according to the invention may comprise further substances, preferably selected from inorganic fillers (C), organic or inorganic fibers (D), flame retardants (E), biocides (F), pigments (G), UV absorbers (H), and HALS stabilizers (I).

Examples of inorganic fillers (C) optionally used are chalk (calcium carbonate), kaolin, silicates, silica or talc.

Examples of fibers (D) optionally used in accordance with the invention are glass fibers, basalt fibers or wollastonite, preference being given to glass fibers or organic fibers such as aramid fibers, wood fibers or cellulose fibers.

If inorganic fibers (D) are used, the amounts involved are preferably from 1% to 50% by weight, particularly preferably 5% to 35% by weight, based in each case on the total weight of the composition. The compositions according to the invention preferably contain no inorganic fibers (D).

If organic fibers (D) are used, the amounts involved are preferably from 20% to 80% by weight, particularly preferably 35% to 65% by weight, based in each case on the total weight of the composition. The compositions according to the invention preferably contain no organic fibers (D).

Examples of flame retardants (E) optionally used in accordance with the invention are organic flame retardants based on halogenated organic compounds or inorganic flame retardants, for example aluminum hydroxide (ATH) or magnesium hydroxide.

When flame retardants (E) are used, preference is given to inorganic flame retardants such as ATH.

Examples of biocides (F) optionally used in accordance with the invention are inorganic fungicides such as borates, for example zinc borate, or organic fungicides, for example thiabendazole.

Examples of pigments (G) optionally used in accordance with the invention are organic pigments or inorganic pigments, for example iron oxides or titanium dioxide.

If pigments (G) are used, the amounts involved are preferably from 0.2% to 7% by weight, particularly preferably 0.5% to 3% by weight, based in each case on the total weight of the composition.

Examples of UV absorbers (H) optionally used in accordance with the invention are benzophenones, benzotriazoles or triazines.

When UV absorbers (H) are used, preference is given to benzotriazoles or triazines.

Examples of HALS stabilizers (I) optionally used in accordance with the invention are for example piperidine or piperidyl derivatives and are available inter alia under the Tinuvin brand names from BASF SE, D-Ludwigshafen.

The compositions according to the invention are preferably those comprising (A) HDPE, (B) organosilicon compounds of the formula $R_2R^2Si[OSiR_2]_p[OSiRR^2]_qOSiR_2R^2$ where R, $R^2$, p and q have the same definitions stated above, preferably R=methyl radical, $R^2=H_{25}C_{12}$—NH—[CO—CO]—NH—$(CH_2)_3$—, p=150 and q=0, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Further preferably, the compositions according to the invention are those comprising (A) LDPE, (B) organosilicon compounds of the formula $R_2R^2Si[OSiR_2]_p[OSiRR^2]_qOSiR_2R^2$ where R, $R^2$, p and q have the same definitions stated above, preferably R=methyl radical, $R^2=H_{25}C_{12}$—NH—[CO—CO]—NH—$(CH_2)_3$—, p=150 and q=0, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Further preferably, the compositions according to the invention are those comprising (A) polypropylene, (B) organosilicon compounds of the formula $R_2R^2Si[OSiR_2]_p[OSiRR^2]_qOSiR_2R^2$ where R, $R^2$, p and q have the same definitions stated above, preferably R=methyl radical, $R^2=H_{25}C_{12}$—NH—[CO—CO]—NH—$(CH_2)_3$—, p=150 and q=0, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Further preferably, the compositions according to the invention are those comprising (A) polyvinyl chloride, (B) organosilicon compounds of the formula $R_2R^2Si$ $[OSiR_2]_p[OSiRR^2]_qOSiR_2R^2$ where R, $R^2$, p and q have the same definitions stated above, preferably R=methyl radical, $R^2=H_{25}C_{12}$—NH—[CO—CO]—NH—$(CH_2)_3$—, p=150 and q=0, optionally (C) inorganic fillers, optionally (D) organic or inorganic fibers, optionally (E) flame retardants, optionally (G) pigments, optionally (H) UV absorbers and optionally (I) HALS stabilizers.

Further preferably, the compositions according to the invention are those comprising (A) HDPE, (B) organosilicon compounds of the formula $R_3Si[OSiR_2]_p[OSiRR^2]_qOSiR_3$ where R, $R_2$, p and q have the same definitions stated above, preferably R=methyl radical, $R^2=H_{25}C_{12}$—NH—[CO—CO]—NH—$(CH_2)_3$—, p=150 and q=2, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Further preferably, the compositions according to the invention are those comprising (A) LDPE, (B) organosilicon compounds of the formula $R_3Si[OSiR_2]_p[OSiRR^2]_qOSiR_3$ where R, $R^2$, p and q have the same definitions stated above, preferably R=methyl radical, $R^2=H_{25}C_{12}$—NH—[CO—CO]—NH—$(CH_2)_3$—, p=150 and q=2, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Further preferably, the compositions according to the invention are those comprising (A) polypropylene, (B) organosilicon compounds of the formula $R_3Si[OSiR_2]_p[OSiRR^2]_qOSiR_3$ where R, $R^2$, p and q have the same definitions stated above, preferably R=methyl radical, $R^2=H_{25}C_{12}$—NH—[CO—CO]—NH—$(CH_2)_3$—, p=150 and q=2, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Further preferably, the compositions according to the invention are those comprising (A) HDPE, (B) organosilicon compounds of the formula $R_2R^2Si$ $[OSiR_2]_p[OSiRR^2]_qOSiR_2R^2$ where R, $R^2$, p and q have the same definitions stated above, preferably R=methyl radical, $R^2=H_{33}C_{16}$—NH—[CO—CO]—NH—$(CH_2)_3$—, p=150 and q=0, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Further preferably, the compositions according to the invention are those comprising (A) LDPE, (B) organosilicon compounds of the formula $R_2R^2Si$ $[OSiR_2]_p[OSiRR^2]_qOSiR_2R^2$ where R, $R^2$, p and q have the same definitions stated above, preferably R=methyl radical, $R^2=H_{33}C_{16}$—NH—[CO—CO]—NH—$(CH_2)_3$—, p=150 and q=0, optionally (C) inorganic fillers, optionally (D) organic or inorganic fibers, optionally (E) flame retardants, optionally (G) pigments, optionally (H) UV absorbers and optionally (I) HALS stabilizers.

Further preferably, the compositions according to the invention are those comprising (A) polypropylene, (B) organosilicon compounds of the formula $R_2R^2Si$ $[OSiR_2]_p[OSiRR^2]_qOSiR_2R^2$ where R, $R^2$, p and q have the same definitions stated above, preferably R=methyl radical, $R^2=H_{33}C_{16}$—NH—[CO—CO]—NH—$(CH_2)_3$—, p=150 and q=0, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

Particularly preferably, the compositions according to the invention are those comprising (A) HDPE, (B) organosilicon compounds of the formula $R_2R^2Si$ $[OSiR_2]_p[OSiRR^2]_qOSiR_2R^2$ where R, $R^2$, p and q have the same definitions stated above, preferably R=methyl radical, $R^2=H_{25}C_{12}$—NH—[CO—CO]—NH—$(CH_2)_3$—, p=150 and q=0, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

In a further particularly preferred embodiment, the compositions according to the invention are those comprising (A) polypropylene, (B) organosilicon compounds of the formula $R_2R^2Si$ $[OSiR_2]_p[OSiRR^2]_qOSiR_2R^2$ where R, $R^2$, p and q have the same definitions stated above, preferably R=methyl radical, $R^2=H_{25}C_{12}$—NH—[CO—CO]—NH—$(CH_2)_3$—, p=150 and q=0, optionally (C) inorganic fillers, optionally (D) organic or inorganic fibers, optionally (E) flame retardants, optionally (F) biocides, optionally (G) pigments, optionally (H) UV absorbers and optionally (I) HALS stabilizers.

The compositions according to the invention preferably contain no further constituents over and above components (A) to (I).

The individual constituents of the compositions according to the invention may in each case be one kind of such a constituent or else a mixture of at least two different kinds of such constituents.

The compositions according to the invention may be produced by any existing known process, such as mixing the components in any desired sequence. Mixers or kneaders or extruders of the prior art may be used for this purpose.

The present invention further relates to a process for producing the compositions according to the invention by mixing components (A) and (B) and optionally further components, preferably selected from components (C) to (I), in any desired sequence.

The process according to the invention may be carried out in the presence or absence of a solvent, preference being given to solvent-free production.

The process according to the invention may be carried out continuously, discontinuously or semicontinuously, but preferably continuously.

The process according to the invention is preferably carried out in continuously operated kneaders or mixers or extruders, wherein the individual components to be mixed according to the invention are each continuously supplied to the mixing unit gravimetrically or volumetrically, either in pure form or as a premix. Components present in the overall mixture at a proportion of less than 1% by weight are preferably supplied as a premix in one of the components present in a larger proportion.

The temperatures at which the process according to the invention is carried out depend primarily on the components used and are known to those skilled in the art, with the proviso that they are below the specific decomposition temperatures of the individual components used. The process according to the invention is preferably carried out at temperatures below 250° C., more preferably in a range from 150 to 220° C.

The process according to the invention is preferably carried out at the pressure of the surrounding atmosphere, that is to say between 900 and 1100 hPa. However, higher pressures may also be employed, depending in particular on the mixing unit used. For instance, the pressure in different areas of the kneaders, mixers or extruders used is for example significantly greater than 1000 hPa.

In a preferred embodiment of the process according to the invention, component (B) is used in what is known as a masterbatch, in the form of a premix with part of the component (A) and optionally one or more of components (C) to (I). This premix is preferably produced by mixing components (A) and (B) and optionally one or more of components (C) to (I) at temperatures between 100° C. and 230° C., it being possible for mixing to be carried out continuously, discontinuously or semicontinuously. Mixers, kneaders or extruders of the prior art may be used for the mixing process.

Components (A) and (B) are preferably mixed continuously in an extruder or kneader of the prior art. The copolymer (B) is present in this premix in an amount preferably between 5% and 40% by weight, more preferably between 10% and 30% by weight, especially preferably between 10% and 25% by weight, based in each case on the weight of the premix.

The premix produced according to the invention is preferably present in the form of pellets or powder, but preferably in the form of pellets. The pellets may also be processed into a powder by mechanical grinding or obtained as micropellets via an appropriate pelletization unit.

In the process according to the invention, the premix thus obtained is then conveyed, preferably continuously, to a heatable mixer along with the remaining portions of component (A) and one or more of components (C) to (I) optionally used. The components may here be added to the mixer separately or added together.

The individual components are then mixed or homogenized at temperatures of preferably from 150 to 240° C., particularly preferably at 180 to 230° C.

After the mixing process of the individual components, the composition according to the invention is then preferably discharged from the reactor as a hot, highly viscous melt via a nozzle. In a preferred process, the material is cooled after discharge by means of a cooling medium and then comminuted or granulated. Here, the cooling of the material and the pelletization can be accomplished simultaneously by underwater pelletization, or one after the other. Either water or air are used as preferred cooling media. Preferred methods of pelletization are underwater pelletization, pelletization by air cutting or strand pelletization. The pellets obtained have a weight of preferably less than 0.5 g, more preferably less than 0.25 g, especially less than 0.125 g. Preferably, the pellets obtained according to the invention are cylindrical or spherical.

The pellets thus obtained may be extruded in a subsequent step by means of further thermoplastic processing to form a molding, preferably a profile. According to a preferred procedure, the compositions according to the invention are continuously conveyed in pellet form into a kneader or extruder of the prior art, heated and plasticized in this kneader or extruder through the influence of temperature, and then pressed through a nozzle that dictates the desired profile shape. Depending on the design of the nozzle, either solid profiles or hollow profiles can be produced here.

The invention further relates to moldings produced by extrusion of the compositions according to the invention or produced according to the invention by processing by means of an injection-molding process.

In a preferred embodiment, the composition according to the invention is extruded directly, via an appropriate nozzle, continuously in the form of a profile or film, which can then—likewise after cooling—be trimmed and/or cut to length.

The composition according to the invention may be produced using mixers or kneaders or extruders of the prior art.

The compositions obtained according to the invention are preferably thermoplastic, meaning that the temperature at which the loss factor (G"/G') in accordance with DIN EN ISO 6721-2:2008 takes the value of 1 is preferably at least 40° C., particularly preferably at least 100° C.

The mixtures according to the invention can be used anywhere that mixtures with thermoplastic polymers have also been employed to date.

The mixtures according to the invention can be used to produce semifinished products such as films, pipes, cable claddings, panels, profiles or fibers or to produce 3-dimensional molded parts.

The compositions according to the invention have the advantage of being easy to produce.

When these compositions are continuously processed into semifinished products, the compositions according to the invention have the advantage of affording products that exhibit better surface quality, that may exhibit improved abrasion resistance, that have lower surface energies, and that show improved mechanical characteristics. Moreover, these semifinished products can be extruded at higher speed.

The production of 3-dimensional moldings from the compositions according to the invention has the advantage that these exhibit increased abrasion resistance, that the processing process can be accelerated on account of the increased flowability of the material, that adhesion to the mold can be reduced, thus allowing demolding forces and demolding times to be reduced, that thinner-walled parts lighter in weight can be produced, and that the surface quality of the moldings produced from the mixtures according to the invention is significantly better, allowing the prevention of rheological effects such as "tiger stripes" that occur during the injection-molding process.

The compositions according to the invention have the advantage that it is now possible for easy-flowing polymers having poorer mechanical characteristics to be replaced with more poorly flowing polymers having better mechanical characteristics, thereby allowing the mechanical characteristics of the compositions to be improved overall.

The use of fillers in the compositions according to the invention has the advantage that the content of fillers may be increased slightly to improve the property profile without this affecting processability. The mixtures according to the invention make it possible to avoid damage to anisotropic fillers such as fibers, which results in an improved property profile.

In the examples described below, all viscosity data are based on a temperature of 25° C. Unless otherwise stated, the examples that follow are carried out at a pressure of the surrounding atmosphere, that is to say at around 1000 hPa, and at a temperature of 20° C., or at the temperature that results when combining the reactants at room temperature without supplemental heating or cooling, and at a relative humidity of about 50%. In addition, unless otherwise stated, all reported parts and percentages relate to weight.

Reactants:

PE 1: High-density polyethylene, commercially available under the name "HDPE, Purell GA 7760" from LyondellBasell, D-Frankfurt;

PE 2: High-density polyethylene, commercially available under the name "HDPE, BB2581" from Borealis Polyolefine, A-Linz;

PP 1: Polypropylene homopolymer, commercially available under the name "HC205 TF" from Borealis Polyolefine, A-Linz;

Amine 1: Dodecylamine, available under the name "Armeen 12D" from Nouryon, Stenungsund, Sweden;

Amine 2: Cocoamine, C8-C18 mixture of aliphatic amines available under the designation "Armee CD" from Nouryon, Stenungsund, Sweden;

Amine 3: 1-aminooctadecane, commercially available under the name Octadecylamine from Sigma-Aldrich;

Amide 1: cis-13-docosenamide, commercially available under the name Erucamide from Sigma-Aldrich;

Amide 2: N,N'-ethylenebis(stearamide), commercially available under the name N,N'-ethylenebis(stearamide) from Sigma-Aldrich;

Amide 3: linear, high molecular weight silicone-oxamide copolymer, produced according to EP 1 963 404 B1, Example 16;

Silicone 1: Ethyloxalamidopropyl-terminated polydimethylsiloxane of the formula $H_5C_2O$—CO—CO—NH—$C_3H_6$—Si$(CH_3)_2$—[OSi$(CH_3)_2]_n$—OSi$(CH_3)_2$—$C_3H_6$—NH—CO—CO—OC$_2H_5$ having a number-average molecular weight Mn of 11 457 g/mol;

Silicone 2: Ethyloxalamidopropyl-terminated polydimethylsiloxane of the formula $H_5C_2O$—CO—CO—

NH—$C_3H_6$—Si$(CH_3)_2$—[OSi$(CH_3)_2]_n$—OSi$(CH_3)_2$—$C_3H_6$—NH—CO—CO—OC$_2H_5$ having a number-average molecular weight Mn of 8103 g/mol.

Example 1

1.146 kg (0.1 mol) of silicone 1 were initially charged in a 2 l, 3-necked flask under a nitrogen atmosphere and heated to 80° C. with stirring. 37.1 g of amine 1 (0.2 mol) were then added and, after stirring for 30 minutes, the ethanol formed was distilled off by applying a pressure of 200 mbar. After stirring for a further 30 minutes, the product obtained was isolated as a polymer melt.

This gave 1173 g of a dodecylaminoxamidopropyl-terminated polydimethylsiloxane of the formula $H_{25}C_{12}NH$—CO—CO—NH—$C_3H_6$—Si$(CH_3)_2$—[OSi$(CH_3)_2]_n$—OSi$(CH_3)_2$—$C_3H_6$—NH—CO—CO—NHC$_{12}H_{25}$ having a number-average molecular weight of 11 733 g/mol and a melting point of 28° C. (silicone 3).

Example 2

1.146 kg (0.1 mol) of silicone 1 were initially charged in a 2 l, 3-necked flask under a nitrogen atmosphere and heated to 80° C. with stirring. 39.7 g of amine 2 (0.2 mol) were then added and, after stirring for 30 minutes, the ethanol formed was distilled off by applying a pressure of 200 mbar. After stirring for a further 30 minutes, the product obtained was isolated as a polymer melt.

This gave 1173 g of a cocoaminoxamidopropyl-terminated polydimethylsiloxane, which is liquid at room temperature, having a number-average molecular weight of 11 752 g/mol (silicone 4).

Example 3

1.146 kg (0.1 mol) of silicone 1 were initially charged in a 2 l, 3-necked flask under a nitrogen atmosphere and heated to 80° C. with stirring. 53.9 g of amine 3 (0.2 mol) were then added and, after stirring for 30 minutes, the ethanol formed was distilled off by applying a pressure of 200 mbar. After stirring for a further 30 minutes, the product obtained was isolated as a polymer melt.

This gave 1175 g of an octadecylaminoxamidopropyl-terminated polydimethylsiloxane having a number-average molecular weight of 11 932 g/mol (silicone 5).

Example 4

0.810 kg (0.1 mol) of silicone 2 were initially charged in a 2 l, 3-necked flask under a nitrogen atmosphere and heated to 60° C. with stirring. 37.1 g of amine 1 (0.2 mol) were then added and, after stirring for 30 minutes, the ethanol formed was distilled off by applying a pressure of 200 mbar. After stirring for a further 30 minutes, the product obtained was isolated as a polymer melt.

This gave 837 g of a dodecylaminoxamidopropyl-terminated polydimethylsiloxane of the formula $H_{25}C_2NH$—CO—CO—NH—$C_3H_6$—Si$(CH_3)_2$—[OSi$(CH_3)_2]_n$—OSi$(CH_3)_2$—$C_3H_6$—NH—CO—CO—NHC$_{12}H_{25}$ having a number-average molecular weight of 8346 g/mol and a melting point of 28° C. (silicone 6).

Example 5

0.810 kg (0.1 mol) of silicone 2 were initially charged in a 2 l, 3-necked flask under a nitrogen atmosphere and heated to 60° C. with stirring. 53.9 g of amine 2 (0.2 mol) were then added and, after stirring for 30 minutes, the ethanol formed was distilled off by applying a pressure of 200 mbar. After stirring for a further 30 minutes, the product obtained was isolated as a polymer melt.

This gave 842 g of a cocoaminoxamidopropyl-terminated polydimethylsiloxane of the formula $H_{37}C_{18}NH$—$CO$—$CO$—$NH$—$C_3H_6$—$Si(CH_3)_2$—$[OSi(CH_3)_2]_n$—$OSi(CH_3)_2$—$C_3H_6$—$NH$—$CO$—$CO$—$NHC_{18}H_{37}$ having a number-average molecular weight of 8488 g/mol (silicone 7).

Examples 6 to 10

The silicones 3-7 prepared above were each mixed homogeneously at room temperature with polyethylene PE 1 in the amounts specified in Table 1, the total amount of the respective mixture being 1000 g.

This mixture was then in each case compounded at a temperature of 195° C. in a counter-rotating twin-screw extruder from Collin. The temperature in the feed area (zone 1) was 95° C., which increased to 190° C. in zone 2 and zone 3 and further increased to 195° C. in zone 4 and zone 5. Zone 6 (nozzle) was heated at 190° C. The mixture was extruded as a strand which was then pelletized. The screw rotation speed was 50 rpm. The discharge rate was about 1.5 kg/h. The melt volume rate (MVR) of the polymer mixtures thus obtained was then determined in accordance with DIN ISO 1133 using an MFI tester from Göttfert (MI II) at a temperature of 175° C., a load weight of 2.16 kg, and a heating time of 5 minutes and with a nozzle diameter of 2 mm. In each case, 3 measured values were determined and these were then averaged.

The results can be found in Table 1.

Example 11

10 g of silicone 3 prepared above were mixed homogeneously at room temperature with 990 g of polyethylene PE 1 in the amounts specified in Table 1, the total amount of the mixture being 1000 g.

This mixture was then in each case compounded at a temperature of 195° C. in a counter-rotating twin-screw extruder from Collin. The temperature in the feed area (zone 1) was 95° C., which increased to 190° C. in zone 2 and zone 3 and further increased to 195° C. in zone 4 and zone 5. Zone 6 (nozzle) was heated at 190° C. The mixture was extruded as a strand which was then pelletized. The screw rotation speed was 50 rpm. The discharge rate was about 1.5 kg/h. The melt volume rate (MVR) of the polymer mixture thus obtained was then determined in accordance with DIN ISO 1133 using an MFI tester from Gottfert (MI II) at a temperature of 175° C., a load weight of 2.16 kg, and a heating time of 5 minutes and with a nozzle diameter of 2 mm. Here, 3 measured values were determined and these were then averaged. The result can be found in Table 1.

Comparative Example C1

The procedure described in Examples 6-10 is repeated, except that none of the silicones 3-7 were used. The results can be found in Table 2.

Comparative Examples C2 to C4

The procedure described in Examples 6-10 is repeated, except that 20 g of each of the amides specified in Table 2 were used instead of the silicones 3-7.

The results can be found in Table 2.

TABLE 2

| Example | PE1 [g] | Amide 1 [g] | Amide 2 [g] | Amide 3 [g] | MVR [ml/10 min] |
|---|---|---|---|---|---|
| C1 | 1000 | — | — | — | 16.3 |
| C2 | 980 | 20 | — | — | 20.4 |
| C3 | 980 | — | 20 | — | 20.2 |
| C4 | 980 | — | — | 20 | 15.9 |

It can be seen that, compared to the high-molecular-weight linear silicone oxamide copolymers of the prior art, the terminally functionalized silicones 3 to 7 in the mixtures of working examples 6 to 11 have significantly higher flow properties. The compositions according to the invention are also more effective or about as effective as standard amide-based processing aids such as eurucamide or EBS (ethylene bis-stearamide). However, due to their low-molecular-weight character, they have a strong tendency to migrate to the surface of the plastic, especially at higher loadings, which is often undesirable.

Examples 12-17

The silicones 3-7 prepared above were each mixed homogeneously at room temperature with polyethylene PE 2 in the amounts specified in Table 3, the total amount of the respective mixture being 1000 g.

This mixture was then compounded at a temperature of 195° C. in a counter-rotating twin-screw extruder from Collin. The temperature in the feed area (zone 1) was 95° C., which increased to 190° C. in zone 2 and zone 3 and further increased to 195° C. in zone 4 and zone 5. Zone 6 (nozzle) was heated at 195° C. The mixture was extruded as a strand which was then pelletized. The screw rotation speed was 50 rpm. The discharge rate was about 1.5 kg/h.

The melt volume rate (MVR) of the polymer mixtures thus obtained was then determined in accordance with DIN ISO 1133 using an MFI tester from Gottfert (MI II) at a temperature of 190° C., a load weight of 10 kg, and a heating time of 5 minutes and with a nozzle diameter of 2 mm. In each case, 3 measured values were determined and these were then averaged.

TABLE 1

| Example | PE1 [g] | Silicone 3 [g] | Silicone 4 [g] | Silicone 5 [g] | Silicone 6 [g] | Silicone 7 [g] | MVR [ml/10 min] |
|---|---|---|---|---|---|---|---|
| 6 | 980 | 20 | — | — | — | — | 24.6 |
| 7 | 980 | — | 20 | — | — | — | 21.8 |
| 8 | 980 | — | — | 20 | — | — | 19.3 |
| 9 | 980 | — | — | — | 20 | — | 22.5 |
| 10 | 980 | — | — | — | — | 20 | 18.5 |
| 11 | 990 | 10 | — | — | — | — | 19.2 |

The results can be found in Table 3.

Comparative Example C5

The procedure described in Examples 12-17 is repeated, except that none of the silicones 3-7 were used. The result can be found in Table 3.

TABLE 3

| Example | PE2 [g] | Silicone 3 [g] | Silicone 4 [g] | Silicone 5 [g] | Silicone 6 [g] | Silicone 7 [g] | MVR [ml/10 min] |
|---|---|---|---|---|---|---|---|
| C5 | 1000 | — | — | — | — | — | 5.8 |
| 12 | 980 | 20 | — | — | — | — | 17.9 |
| 13 | 980 | — | 20 | — | — | — | 16.3 |
| 14 | 980 | — | — | 20 | — | — | 15.2 |
| 15 | 980 | — | — | — | 20 | — | 16.8 |
| 16 | 980 | — | — | — | — | 20 | 15.3 |
| 17 | 980 | 10 | — | — | — | — | 14.0 |

Examples 18-23

The silicones 3-7 prepared above were each mixed homogeneously at room temperature with polypropylene homopolymer PP 1 in the amounts specified in Table 4, the total amount of the respective mixture being 1000 g.

This mixture was then compounded at a temperature of 210° C. in a counter-rotating twin-screw extruder from Collin. The temperature in the feed area (zone 1) was 95° C., which increased to 190° C. in zone 2 and zone 3 and further increased to 205° C. in zone 4 and zone 5. Zone 6 (nozzle) was heated at 200° C. The mixture was extruded as a strand which was then pelletized. The screw rotation speed was 50 rpm. The discharge rate was about 1.5 kg/h.

The melt volume rate (MVR) of the polymer mixtures thus obtained was then determined in accordance with DIN ISO 1133 using an MFI tester from Göttfert (MI II) at a temperature of 230° C., a load weight of 2.16 kg, and a heating time of 5 minutes and with a nozzle diameter of 2 mm. In each case, 3 measured values were determined and these were then averaged.

The results can be found in Table 4.

Comparative Example C6

The procedure described in Examples 18-23 is repeated, except that none of the silicones 3-7 were used. The result can be found in Table 4.

TABLE 4

| Example | PP1 [g] | Silicone 3 [g] | Silicone 4 [g] | Silicone 5 [g] | Silicone 6 [g] | Silicone 7 [g] | MVR [ml/10 min] |
|---|---|---|---|---|---|---|---|
| C6 | 1000 | — | — | — | — | — | 5.9 |
| 18 | 980 | 20 | — | — | — | — | 11.8 |
| 19 | 980 | — | 20 | — | — | — | 11.2 |
| 20 | 980 | — | — | 20 | — | — | 10.3 |
| 21 | 980 | — | — | — | 20 | — | 10.0 |
| 22 | 980 | — | — | — | — | 20 | 9.5 |
| 23 | 980 | 10 | — | — | — | — | 8.8 |

The invention claimed is:

1. A composition comprising
(A) A thermoplastic polymer, and
(B) at least one organosilicon compound of the formula $$R_{3-a-b}(OR^1)_a R^2_b Si[OSiR_2]_p[OSiRR^2]_q[OSiR^2_2]_r O\text{-}SiR_{3-a-b}(OR^1)_a R^2_b \quad (I),$$

where
R are each identical or different and are monovalent, SiC-bonded hydrocarbon radicals having 1 to 6 carbon atoms,
$R^1$ are each identical or different and are hydrogen or monovalent, optionally substituted hydrocarbon radicals, $R^2$ is an SiC-bonded unit of the formula $$R^3\text{—}X\text{—}[CO\text{—}CO]\text{—}X\text{—}R^4\text{—} \quad (II)$$

where
X is —NR$^x$—,
$R^3$ are each identical or different and are monovalent, optionally substituted hydrocarbon radicals having at least 6 carbon atoms,
$R^4$ are divalent, optionally substituted hydrocarbon radicals having 1 to 40 carbon atoms, wherein individual carbon atoms are optionally replaced by oxygen atoms or —NR$^z$—,
$R^x$ are each identical or different and are hydrogen or monovalent, optionally substituted hydrocarbon radicals having 1 to 20 carbon atoms, wherein individual carbon atoms may be replaced by oxygen atoms,
$R^z$ are each identical or different and are hydrogen or monovalent, optionally substituted hydrocarbon radicals having 1 to 20 carbon atoms, wherein individual carbon atoms may be replaced by oxygen atoms,
a is 0, 1, 2 or 3,
b is 0 or 1,
p is an integer from 1 to 1000,
q is 0 or an integer from 1 to 100 and
r is 0 or an integer from 1 to 100,
with the proviso that a+b is ≤3 and at least one $R^2$ radical is present.

2. The composition of claim 1, wherein component (A) comprises polyethylene, polypropylene, polyamide, polyethylene terephthalate or polybutylene terephthalate.

3. The composition of claim 1, wherein organosilicon compounds of the formula (I) have a number-average molecular weight Mn of 1000 g/mol to 35,000 g/mol.

4. The composition of claim 1, wherein organosilicon compounds of the formula (I) have a number-average molecular weight Mn of 3000 g/mol to 20,000 g/mol.

5. The composition of claim 1, wherein component (B) is used in amounts of 0.05 parts by weight to 10 parts by weight, based on 100 parts by weight of component (A).

6. The composition of claim 1, wherein said composition, in addition to components (A) and (B), comprises at least one further substance selected from the group consisting of inorganic fillers (C), organic or inorganic fibers (D), flame retardants (E), biocides (F), pigments (G), UV absorbers (H) and HALS stabilizers (I).

7. A composition comprising (A) thermoplastic polymers and (B) at least one organosilicon compound of the general formula $$R_{3-a-b}(OR^1)_aR^2_bSi[OSiR_2]_p[OSiRR^2]_q[OSiR^2_2]_rO\text{-}SiR_{3-a-b}(OR^1)_aR^2_b \quad (I),$$

where

R may be identical or different and is a monovalent, SiC-bonded hydrocarbon radical having 1 to 6 carbon atoms, $R^1$ each are identical or different and are hydrogen or monovalent, optionally substituted hydrocarbon radicals, $R^2$ is an SiC-bonded unit of the formula $$R^3\text{—}X\text{—}[CO\text{—}CO]\text{—}X\text{—}R^4\text{—} \quad (II)$$

where

X is —NR$^x$—, $R^3$ each are identical or different and are monovalent, optionally substituted hydrocarbon radicals having at least 6 carbon atoms, $R^4$ are divalent alkylene radicals having 1 to 40 carbon atoms, wherein individual carbon atoms are optionally replaced by oxygen atoms or —NR$^z$—, $R^x$ are each identical or different and are hydrogen or monovalent, optionally substituted hydrocarbon radicals having 1 to 20 carbon atoms, wherein individual carbon atoms may be replaced by oxygen atoms, $R^z$ each are identical or different and are hydrogen or monovalent, optionally substituted hydrocarbon radicals having 1 to 20 carbon atoms, wherein individual carbon atoms may be replaced by oxygen atoms, a is 0, 1, 2 or 3, b is 0 or 1, p is an integer from 1 to 1000, q is 0 or an integer from 1 to 100 and r is 0 or an integer from 1 to 100, with the proviso that a+b is ≤3 and at least one $R^2$ radical is present.

8. The composition of claim 7, wherein organosilicon compounds of the formula (I) have a number-average molecular weight Mn of 1000 g/mol to 35,000 g/mol.

9. The composition of claim 7, wherein $R^3$ is an optionally substituted aliphatic hydrocarbon radical.

10. The composition of claim 7, wherein $R^3$ contains at least 10 carbon atoms, and is an optionally substituted aliphatic hydrocarbon radical.

11. The composition of claim 7, wherein $R^4$ is a methylene or n-propylene radical.

\* \* \* \* \*